(No Model.) 2 Sheets—Sheet 1.
C. O. GEHRCKENS.
DRIVING BELT.
No. 309,708. Patented Dec. 23, 1884.
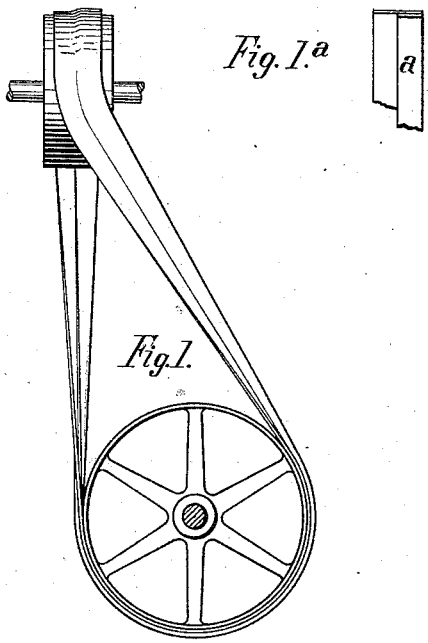
Fig. 1.ᵃ
Fig. 1.
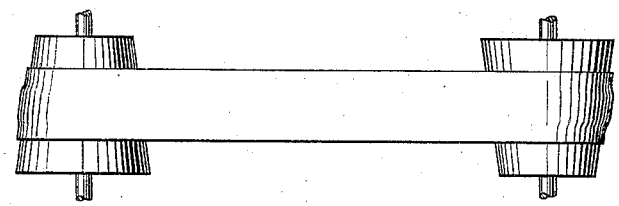
Fig. 2.
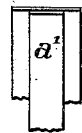
Fig. 2.ᵃ
Witnesses:
C. T. Bell
Geo. W. Wilt
Inventor:
Carl Otto Gehrckens.

(No Model.) 2 Sheets—Sheet 2.
C. O. GEHRCKENS.
DRIVING BELT.
No. 309,708. Patented Dec. 23, 1884.
Fig. 3.
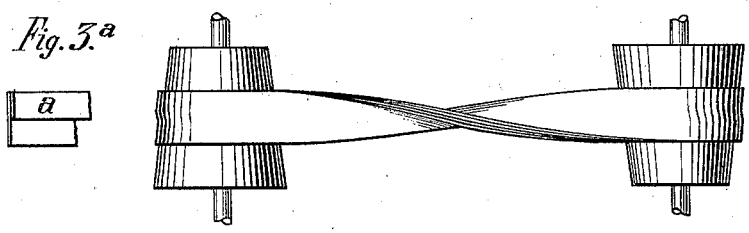
Fig. 3.ᵃ     Fig. 3.ᵇ
Fig. 4.ᵃ
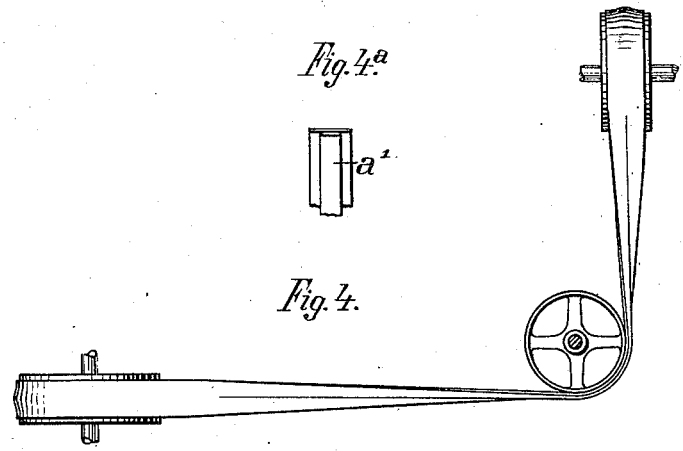
Fig. 4.
Witnesses:
C. S. Beer
Geo. W. Wilt
Inventor
Carl Otto Gehrckens.

//!-->
UNITED STATES PATENT OFFICE.

CARL OTTO GEHRCKENS, OF HAMBURG, GERMANY.

DRIVING-BELT.

SPECIFICATION forming part of Letters Patent No. 309,708, dated December 23, 1884.

Application filed October 13, 1884. (No model.)

*To all whom it may concern:*

Be it known that I, CARL OTTO GEHRCKENS, a subject of the Emperor of Germany, and a resident of Hamburg, in the German Empire, have invented certain new and useful Improvements in Driving-Belts, of which the following is a specification.

The invention relates to improvements in crossed or half-crossed driving-belts; and the object of my improvements is to thicken such belts partly lengthwise.

The outer edge of half-crossed belts becomes longer than the inner one by using common belts, as the radius of the curve described by the outer edge is longer than the radius of the inner curve. To prevent such inconvenience and to obtain an equal tension on both edges of such belt, I lengthen according to my invention the radius of that part of the pulley whereon the inner edge of the belt is running by placing lengthwise one strip, $a$, or two or more, of the belting material under the inner edge of the belt, (as is illustrated in Figure 1 of the accompanying drawings by a side elevation, and in Fig. 1$^a$ in a cross-section of the belt,) until the tension on both edges of such belt is equalized.

When driving by open belts conical pulleys arranged by pairs in such a manner as to bring the smallest diameter of the one opposite to the largest diameter of the other one, as shown in Fig. 2 by a top view, I use belts double or nearly double as broad as usually by placing the thickening-strip $a'$ into the center of such belt, as illustrated by the cross-section, Fig. 2$^a$. One edge of the belt thereby will run freely without or by slightly touching the pulley, while that surface of the belt which is necessary for transferring the power is kept in proper contact with the pulley.

Conical pulleys when arranged in the above-described manner, but driven by crossed belts, as illustrated by the top view Fig. 3, require belts with thickening-strips $a$ at one edge of the belt, (whereof Figs. 3$^a$ and 3$^b$ show cross-sections of the belt with reference to the adjacent pulleys,) as the thickening-strip equalizes the diameters of the opposite parts of such conical pulleys.

When driving shafts which may or may not be at right angles, but in or near the same plane, by running the belt on four or more pulleys, as it may be seen in the side elevation, Fig. 4, both edges of the belt have to make a longer way than its center. I therefore place a thickening-strip, $a'$, beneath such center line, as shown in the cross-section, Fig. 4$^a$, thereby equalizing the velocity of all parts of the belt.

Having thus fully described the nature of my said invention, what I desire to claim and secure by Letters Patent is—

1. In combination with a driving-belt, one, two, or more thickening-strips, $a$, placed beneath one edge of the belt, substantially as and for the purpose specified.

2. In combination with a driving-belt, one, two, or more thickening-strips, $a'$, placed beneath the center line of the belt, substantially as and for the purpose specified.

In testimony that I claim the foregoing as my invention I have signed my name in presence of two witnesses.

CARL OTTO GEHRCKENS.

Witnesses:
ALEXANDER SPECHT,
DIEDRICH PETERSEN.